(12) United States Patent
Neudecker (10) Patent No.: US 12,311,791 B2
(45) Date of Patent: May 27, 2025

(54) ENERGY STORAGE DEVICE FOR ELECTRIC ENERGY, CHARGING ARRANGEMENT AND METHOD FOR INSTALLING AN ENERGY STORAGE DEVICE OR CHARGING ARRANGEMENT

(71) Applicant: AUDI AG, Ingolstadt (DE)

(72) Inventor: Ansgar Neudecker, Greding (DE)

(73) Assignee: AUDI AG, Ingolstadt (DE)

( * ) Notice: Subject to any disclaimer, the term of this patent is extended or adjusted under 35 U.S.C. 154(b) by 703 days.

(21) Appl. No.: 17/469,518

(22) Filed: Sep. 8, 2021

(65) Prior Publication Data
US 2022/0072970 A1 Mar. 10, 2022

(30) Foreign Application Priority Data
Sep. 9, 2020 (DE) .......................... 102020123475.9

(51) Int. Cl.
| | | |
|---|---|---|
| *B60L 53/31* | (2019.01) | |
| *B60L 53/30* | (2019.01) | |
| *B60L 53/302* | (2019.01) | |
| *B60L 53/53* | (2019.01) | |
| *H02J 7/00* | (2006.01) | |

(Continued)

(52) U.S. Cl.
CPC .............. *B60L 53/31* (2019.02); *B60L 53/30* (2019.02); *B60L 53/302* (2019.02); *B60L 53/53* (2019.02); *H02J 7/0045* (2013.01); *H02J 7/02* (2013.01); *H02J 50/10* (2016.02)

(58) Field of Classification Search
CPC ........ B60L 53/30; B60L 53/302; B60L 53/53; B60L 53/55; B60L 53/31; H02J 7/0045; H02J 7/02; H02J 7/342; H02J 50/10

USPC ...................... 320/107, 109, 113; 307/43, 80
See application file for complete search history.

(56) References Cited

U.S. PATENT DOCUMENTS 5,612,606 A * 3/1997 Guimarin ............ H01M 50/204
414/281
6,307,347 B1 * 10/2001 Ronning .................. B60L 53/16
320/109

(Continued)

FOREIGN PATENT DOCUMENTS

| CN | 104505913 A | 4/2015 |
|---|---|---|
| CN | 105857108 A | 8/2016 |

(Continued)

OTHER PUBLICATIONS https://www.ncdot.gov/initiatives-policies/Transportation/bridges/historic-bridges/bridge-types/Pages/truss.aspx (Year: 2020).*

(Continued)

*Primary Examiner* — John T Trischler
(74) *Attorney, Agent, or Firm* — Seed IP Law Group LLP (57) ABSTRACT

An energy storage device for electrical energy for charging an electric motor vehicle including at least one battery module, a housing for accommodating the at least one battery module and a connection device for connection to a power supply for charging the at least one battery module from a power grid, wherein the flat energy storage device has a reinforcing structure which make it possible for a motor vehicle, in particular a passenger car, to drive over a top surface of the energy storage device arranged on a ground surface which can be driven upon.

17 Claims, 4 Drawing Sheets

(51) Int. Cl.
  *H02J 7/02*  (2016.01)
  *H02J 50/10*  (2016.01)

(56) References Cited

U.S. PATENT DOCUMENTS

| | | | | |
|---|---|---|---|---|
| 6,396,239 | B1* | 5/2002 | Benn | H01M 50/24 |
| | | | | 320/101 |
| 6,525,510 | B1* | 2/2003 | Ayano | B60L 53/31 |
| | | | | 320/108 |
| 7,492,120 | B2* | 2/2009 | Benn | F24S 30/452 |
| | | | | 320/109 |
| 7,602,143 | B2* | 10/2009 | Capizzo | G07F 7/06 |
| | | | | 320/109 |
| 7,768,229 | B2* | 8/2010 | Zhang | B60L 58/18 |
| | | | | 307/66 |
| 7,898,212 | B2* | 3/2011 | Benn | H02S 10/40 |
| | | | | 126/573 |
| 8,164,302 | B2* | 4/2012 | Capizzo | B60L 53/305 |
| | | | | 320/109 |
| 8,254,090 | B2* | 8/2012 | Prax | H02S 10/12 |
| | | | | 361/601 |
| 8,366,371 | B2* | 2/2013 | Maniscalco | H01M 50/204 |
| | | | | 414/222.07 |
| 8,461,804 | B1* | 6/2013 | Capizzo | B60L 53/66 |
| | | | | 320/109 |
| 8,599,537 | B2* | 12/2013 | Prax | F24S 25/10 |
| | | | | 361/728 |
| 8,773,079 | B2* | 7/2014 | Ali | H02K 7/025 |
| | | | | 320/167 |
| 8,797,719 | B2* | 8/2014 | Prax | H02S 10/12 |
| | | | | 361/601 |
| 8,816,528 | B2* | 8/2014 | Prax | H02S 10/12 |
| | | | | 361/825 |
| 8,879,242 | B2* | 11/2014 | Prax | H02J 3/322 |
| | | | | 52/173.3 |
| 9,065,423 | B2* | 6/2015 | Ganem | H02J 50/50 |
| 9,112,208 | B2* | 8/2015 | Kohlberger | H01M 10/613 |
| 9,467,002 | B2* | 10/2016 | Martin | B60L 58/24 |
| 9,553,636 | B2* | 1/2017 | Maikawa | H01F 38/14 |
| 9,688,252 | B2* | 6/2017 | Gaffoglio | B60L 53/80 |
| 9,738,167 | B2* | 8/2017 | Shimizu | B60L 53/124 |
| 10,300,801 | B2* | 5/2019 | Gaffoglio | B60L 53/36 |
| 10,404,102 | B2* | 9/2019 | Sugasawa | H02J 50/12 |
| 10,589,633 | B2* | 3/2020 | Layden | B60L 53/31 |
| 11,312,253 | B2* | 4/2022 | Cole | B60L 53/16 |
| 11,485,246 | B1* | 11/2022 | Chase | B60L 53/39 |
| 11,584,246 | B2* | 2/2023 | Ruppert | B60L 50/66 |
| 11,597,291 | B1* | 3/2023 | Bikumala | B60L 53/60 |
| 11,667,205 | B2* | 6/2023 | Helm | B60L 53/12 |
| | | | | 320/108 |
| 11,670,954 | B2* | 6/2023 | Krishnan | H02J 7/0013 |
| | | | | 320/110 |
| 11,718,194 | B2* | 8/2023 | Miler | B60L 53/665 |
| | | | | 320/109 |
| 11,780,469 | B1* | 10/2023 | Roy | B60L 53/35 |
| | | | | 701/22 |
| 11,820,245 | B2* | 11/2023 | Angermeier | H02J 50/005 |
| 11,912,144 | B2* | 2/2024 | Wheatley | B60L 53/52 |
| 11,993,163 | B2* | 5/2024 | Austrheim | B65G 1/0492 |
| 12,155,233 | B2* | 11/2024 | Rodriguez Bravo | H02J 50/80 |
| 2002/0180404 | A1* | 12/2002 | Benn | H01M 10/465 |
| | | | | 320/101 |
| 2003/0030411 | A1* | 2/2003 | Ayano | B60L 3/00 |
| | | | | 320/109 |
| 2007/0113921 | A1* | 5/2007 | Capizzo | B60L 53/80 |
| | | | | 141/231 |
| 2008/0067974 | A1* | 3/2008 | Zhang | B60L 53/63 |
| | | | | 903/907 |
| 2009/0314382 | A1* | 12/2009 | Capizzo | B60K 15/063 |
| | | | | 141/2 |
| 2010/0060229 | A1* | 3/2010 | Benn | H01M 50/24 |
| | | | | 320/101 |
| 2010/0109604 | A1 | 5/2010 | Boys et al. | |
| 2011/0057512 | A1* | 3/2011 | Prax | H02S 10/40 |
| | | | | 361/728 |
| 2011/0058312 | A1* | 3/2011 | Prax | F24S 25/10 |
| | | | | 320/101 |
| 2011/0058664 | A1* | 3/2011 | Prax | H02S 10/12 |
| | | | | 379/324 |
| 2012/0218687 | A1* | 8/2012 | Prax | F03D 9/25 |
| | | | | 361/641 |
| 2012/0224326 | A1* | 9/2012 | Kohlberger | H01M 10/656 |
| | | | | 361/689 |
| 2012/0235500 | A1* | 9/2012 | Ganem | H02J 50/60 |
| | | | | 307/104 |
| 2012/0249065 | A1 | 10/2012 | Bissonette et al. | |
| 2012/0262849 | A1* | 10/2012 | Prax | F24S 25/10 |
| | | | | 361/641 |
| 2012/0286730 | A1* | 11/2012 | Bonny | B60L 53/14 |
| | | | | 320/109 |
| 2013/0017372 | A1* | 1/2013 | Mechling | A63B 6/00 |
| | | | | 428/192 |
| 2013/0169062 | A1* | 7/2013 | Maikawa | B60L 53/124 |
| | | | | 307/104 |
| 2014/0021914 | A1* | 1/2014 | Martin | B60L 50/16 |
| | | | | 320/109 |
| 2015/0307068 | A1* | 10/2015 | Gaffoglio | B60L 50/60 |
| | | | | 414/809 |
| 2016/0052407 | A1* | 2/2016 | Shimizu | H02J 50/005 |
| | | | | 320/108 |
| 2017/0151881 | A1* | 6/2017 | Lee | B60L 53/80 |
| 2017/0259675 | A1* | 9/2017 | Gaffoglio | B60L 50/60 |
| 2017/0288465 | A1* | 10/2017 | Sugasawa | H02J 50/12 |
| 2017/0368949 | A1* | 12/2017 | Layden | B60L 53/11 |
| 2019/0039464 | A1* | 2/2019 | Greifelt | B60L 53/12 |
| 2019/0225098 | A1* | 7/2019 | Helm | H02J 50/10 |
| 2020/0139835 | A1* | 5/2020 | Miler | B60L 53/63 |
| 2020/0406770 | A1* | 12/2020 | Ruppert | B60L 53/16 |
| 2021/0023955 | A1* | 1/2021 | Schier | B60L 53/18 |
| 2021/0086631 | A1* | 3/2021 | Cole | B60L 53/35 |
| 2021/0162877 | A1* | 6/2021 | Austrheim | B60L 53/16 |
| 2021/0188105 | A1* | 6/2021 | Wheatley | H02S 10/12 |
| 2021/0288512 | A1* | 9/2021 | Krishnan | H02J 7/35 |
| 2022/0134893 | A1* | 5/2022 | Liu | B60L 53/57 |
| | | | | 320/109 |
| 2022/0169135 | A1* | 6/2022 | Todeschini | B60L 53/53 |
| 2023/0052681 | A1* | 2/2023 | Hemrle | B60L 53/16 |
| 2023/0089953 | A1* | 3/2023 | Angermeier | H02J 50/10 |
| | | | | 320/108 |
| 2023/0112408 | A1* | 4/2023 | Rodriguez Bravo | H02J 50/90 |
| | | | | 320/108 |
| 2023/0339346 | A1* | 10/2023 | Miler | B60L 53/62 |
| 2023/0415784 | A1* | 12/2023 | Roy | B60L 53/35 |
| 2024/0051420 | A1* | 2/2024 | Neudecker | B60L 53/51 |
| 2024/0097481 | A1* | 3/2024 | Krishnan | H02J 7/00712 |

FOREIGN PATENT DOCUMENTS

| | | | | |
|---|---|---|---|---|
| CN | 110676906 A | | 1/2020 | |
| CN | 110733376 A | | 1/2020 | |
| CN | 112428845 A | * | 3/2021 | |
| DE | 202013010416 | * | 2/2014 | |
| DE | 202014104247 U1 | * | 10/2014 | F03G 7/08 |
| DE | 10 2017 106 782 A1 | | 10/2017 | |
| DE | 102017103565 A1 | * | 8/2018 | B60L 50/50 |
| DE | 10 2017 117 418 A1 | | 2/2019 | |
| DE | 102017119465 A1 | | 2/2019 | |
| DE | 102018204056 A1 | * | 9/2019 | |
| DE | 102022202925 A1 | * | 9/2023 | |
| WO | 2020/176860 A1 | | 9/2020 | |

OTHER PUBLICATIONS

DE102017103565_Description_Machine_Translation.pdf (Year: 2018).*
Merton Council "Appendix C1 Vehicle Length Data Summary" (Year: 2018).*
DE102018204056A1_Description_Translation (Year: 2018).*

* cited by examiner

ENERGY STORAGE DEVICE FOR ELECTRIC ENERGY, CHARGING ARRANGEMENT AND METHOD FOR INSTALLING AN ENERGY STORAGE DEVICE OR CHARGING ARRANGEMENT

BACKGROUND

Technical Field

Embodiments of the invention relate to an energy storage device for electrical energy for charging an electric motor vehicle, comprising at least one battery module, a housing for accommodating the at least one battery module and a connection device for connection to a power supply for charging the at least one battery module from a power grid. In addition, embodiments of the invention relate to a charging arrangement comprising such an energy storage device and a method of installing an energy storage device or charging arrangement.

Description of the Related Art

Electric motor vehicles have already been proposed in the prior art and have an electric motor in their drive train for propulsion, which is powered by an associated high-voltage battery. In order to be able to charge the high-voltage battery, it is known to provide charging arrangements, for example charging columns or wallboxes. This is a problematic issue, in particular for private electric vehicles, as it may require interventions to the domestic power grid infrastructure, since only a few private parking areas for electric vehicles already have adequate electrical connections and infrastructure.

In this context, but also in general, it has already been proposed to use energy storage devices that act as buffer storage for storing electrical energy, for example in order to be able to supply self-generated electricity from a photovoltaic system during the day to one's own electric motor vehicle and to other domestic consumers at night. In this, it is known, for example, to use stackable battery modules that, when combined on top of each other, provide a certain buffer size. Furthermore, energy storage devices have already been proposed that can be suspended from a wall and comprise, for example, a housing in which at least one battery module is arranged.

Common parking spaces for electric vehicles that are assigned to residential space include, for example, garages, carports, parking lots and underground parking spaces. Common parking space conditions however only allow the installation of such energy storage devices as buffer storage while concurrently imposing significant restrictions to the theoretically available parking/garage space. For example, the usability of garages for this purpose is considerably restricted if, in addition to a wallbox that is used as a motor vehicle charging device, battery storage modules are also to be installed or alternatively hung on a wall. In particular, taking into consideration the increasingly larger motor vehicles, the standard garages of today have too little space to install or hang corresponding energy storage devices. The space requirements for existing buffer storage solutions compete with storage space for bicycles, lawn mowers and the like and can hinder convenient access to the electric motor vehicle. If underground parking spaces are considered, for a parking space with other parking spaces immediately adjacent, there is only one available wall, which is problematic in terms of the length of motor vehicles.

Furthermore, with regard to the charging of electric motor vehicles, it should also be noted that a charging infrastructure, in particular in the form of a motor vehicle charging device, which is dependent on the existing domestic infrastructure, is absolutely necessary. In addition to existing cable and wallbox solutions, work is currently underway on various automated solutions. For example, inductive charging solutions are available on the market and conductive solutions, which is to say those using charging cables, have also been proposed in the state of the art. Motor vehicle charging devices use power grid output provided by the domestic power grid as the maximum charging power, which can lead to long charging times.

CN 204505913 A relates to a parking lot with a plurality of parking spaces associated with a movable charging robot and a robot management system. The charging robot includes a robot body, a mechanism for locomotion, an energy storage component, and a control unit so that the charging robot can travel to a parked electric motor vehicle. There, charging of the electric motor vehicle can be performed by means of the robot.

CN 110733376 A relates to an automatic charging and discharging system for a power battery of a vehicle. In this system, the power battery can be installed in a vehicle, then disconnected from the vehicle, and moved automatically. In this way, the charging process and the utilization process are to be decoupled.

BRIEF SUMMARY

Embodiments of the invention are based on the task of specifying an energy storage device which shows improvement in terms of required installation space and is easy to handle.

In order to solve this task, an energy storage device of the type mentioned above, is provided, wherein the flat energy storage device has a reinforcing structure which makes it possible for a motor vehicle, in particular a passenger car, to drive over a top surface of the energy storage device which is arranged on a ground surface upon which can be driven.

It is therefore proposed to provide a flat battery storage unit with a housing creating a top surface which can be driven upon, at least one battery module, and a connection device for connection to a power supply for charging the at least one battery module from a power grid, which unit can be placed on a ground surface which can be driven upon in such a way that the area which can be driven upon is not reduced inasmuch as the housing of the energy storage device itself is designed to be driven upon, this by providing structural reinforcement through the reinforcement structure. Thus, an energy storage device which can be driven upon, in particular a buffer storage which can be driven upon, is provided, which—except for the connection to the power grid—can be laid out on the ground surface which can be driven upon, in particular a parking space for a motor vehicle, without any structural modification. In this way, a user can integrate a buffer storage unit into their charging infrastructure without any loss of usable space. The ground surface which can be driven upon that is underneath the motor vehicle, in particular in a garage or in another parking space assigned to residential space, does not compete with the storage space for the motor vehicle, with a lawn mower and/or bicycle corner, with convenient access to the motor vehicle, to the entrance door, to the garage door and the like. Consequently, it has been recognized that the ground surface that can be driven upon beneath the motor vehicle is a space that is available to a user and where a slight elevation does not have any negative effect.

The reinforcing structure, which can generally also comprise components of the housing, can thereby be designed in such a way that at least one specific type of motor vehicle can drive over the top surface that can be driven upon without any problems and, in particular, can also park there. For example, the specific design may be aimed at passenger cars, whereby it is just as possible to have a design that also allows trucks or other, heavier land vehicles drive on it.

It should also be noted that the application of the energy storage device described herein is not only advantageous as a ground surface that can be driven upon for parking areas associated with residential spaces, but can of course also be used in other places, for example at charging stations, rest areas along a highway and in public spaces, in particular in connection with suitable motor vehicle charging devices that use the energy storage device.

In some embodiments, the top surface that can be driven upon may be textured and/or have a friction-enhancing coating to provide a good grip for the motor vehicle when driving over the housing. The energy storage device may, moreover, also comprise an anchoring arrangement for attaching the energy storage device, specifically the housing, to the ground surface that can be driven upon. Such an anchoring arrangement may, for example, comprise through-holes in the housing through which a fastening means, for example a bolt, and/or projecting fastening projections for interaction with such fastening means may be passed. It is, however, particularly advantageous if the energy storage device, specifically the housing, can ultimately be simply laid out on the ground surface which can be driven upon, in particular the parking area, and can, just as easily, be uninstalled.

By means of the connection device, the at least one battery module, which may each comprise one or more battery cells, can be charged from a power grid, for example a common power grid providing a certain power grid output, which is associated with the residential space. The power grid output of such a power grid may be, for example, 11 kW. A photovoltaic device, which is installed, for example, on the roof of a residential space, for example a house, associated with the ground surface which can be driven upon, in particular the parking space, can also be connected to the power grid with particular advantage, so that the at least one battery module of the energy storage device can, in this respect, also act as a buffer storage and, for example, provide electrical energy generated during the day for charging electric motor vehicles and/or for domestic consumers at night.

The charging of the at least one battery module may be carried out by means of the at least one mains charging device assigned to the energy storage device. In this context, it is with particular advantage, that the energy storage device can have the mains charging device, for charging the at least one battery module from the power grid by means of the connection device, installed in the housing, in particular in a receptacle. This means that the mains charging device can just as easily also be accommodated in the housing, thus integrated into the energy storage device, so that only the energy storage device that has been laid out still has to be connected to the power grid by means of a cable, for example using a conventional socket, so that the at least one battery module can be charged from the power grid, but can also feed electrical energy back into the power grid in order to act as a buffer storage for the power grid. It is also conceivable that the connection device described herein is designed for connection to a mains charging device that is external to the housing.

The operation of the energy storage device can be controlled by means of a control device which may also be at least partially incorporated in the housing and which is designed, in particular, to control the charging operation of the at least one battery module and/or to control the supply of electrical energy stored in the at least one battery module to the power grid. Furthermore, the control device can also be used for monitoring the at least one battery module, in particular for the state of charge, and/or possible defects. Furthermore, since the energy storage device may also have a cooling device for the at least one battery module, the control device may also be designed for temperature management, in particular to therefore be connected to at least one temperature sensor of the energy storage device and/or to perform temperature monitoring and/or temperature control, in particular to accordingly therefore also control the operation of the cooling device. Such a cooling device, in particular, uses a cooling fluid, for example water and/or oil, that is conducted through the at least one cooling line or at least one cooling channel, as is known from battery modules of this type.

In some embodiments, the top surface which can be driven upon can be formed by an upper side of the housing, which is at least substantially cuboid-shaped. This means that the housing can be designed in particular as a flat cuboid, the upper side of which can be driven over by motor vehicles, in particular passenger cars, thanks to the reinforcing structure. The top surface which can be driven upon, on the upper side of the housing, may be formed by a sufficiently stable cover plate which, in particular, forms part of the reinforcing structure. As already mentioned, this can have a top surface structuring and/or be coated to increase friction.

In some embodiments, the reinforcing structure can have support elements arranged within the housing, in particular arranged equidistantly in each of two mutually perpendicular directions and/or extending substantially over the entire extent of the housing. Such support elements can be interpreted as reinforcing struts and, with particular advantage, can be made of steel in order to provide the desired sturdy reinforcing effect while remaining inexpensive and easy to provide. Support elements may be provided in the transverse and longitudinal directions, which then respectively serve as transverse and longitudinal supports for the load acting on the housing in the gravitational direction when being driven upon or during parking. The support elements can have a cross section that promotes the load-bearing or reinforcing effect, for example in the form of square section steel.

In this context the support elements, which are, in particular, arranged in a grid-like manner, may define at least one receptacle for the at least one battery module in their intermediate spaces, wherein the at least one battery module is, in particular, arranged in one of the at least one receptacles in an exchangeable manner. It is thus conceivable, for example, that the reinforcement structure has a lattice frame, in particular a steel frame, similar to a framework, wherein the resulting lattice openings, which can also be referred to as segments, form receptacles, of which, in particular, at least one serves to receive the at least one battery module. The size of the receptacles can correspond at least substantially to the size of the battery module. Incidentally, receptacles can also be formed for further components of the energy storage device, for example for the aforementioned mains charging device, the control device, a so-called battery junction box (BJB), cooling components of the cooling device and the like. The receptacles can be designed in such a way that at least the battery modules are interchangeable and/or with the insertion of a battery module into the receptacle, an electrical connection to a corresponding electrical wiring system and/or a cooling connection to the cooling device takes place. In order to provide access to the corresponding receptacles, the upper side of the housing, which in particular also serves as a top surface which can be driven upon, can have corresponding access flaps, slides and/or the like.

Some embodiments can further provide that at least one electrical line and/or control signal line to the at least one battery module and/or at least one cooling line for a cooling fluid of a cooling device of the energy storage device, which serves to cool the at least one battery module, is arranged within at least one support element designed as a hollow body, in particular as a square element. The further stabilizing and reinforcing design as a hollow body or hollow element can therefore also be used to provide installation space that can be used to lay various types of lines, in particular power lines, control signal lines and/or cooling lines, so that, as an advantageous side effect, the lines can be routed in a protected manner that is largely invisible from the outside.

In the case, for example, of housings having an extremely sleek design without great vertical rise, while it is, in principle, conceivable that the motor vehicle can overcome the difference in height to the top surface which can be driven upon of the energy storage device by means of its wheels, some embodiments provide that the energy storage device further has a drive-on aid, in particular a ramp, arranged on at least one lateral edge of the flat housing. Such an inclined drive-on ramp facilitates or, in the case of higher housings, makes it possible to drive onto the housing and, so to speak, connects the top surface which can be driven upon to the remaining ground surface which can be driven upon surrounding the installation location. In this way, there is in particular also an improvement in driving comfort when driving upon and/or parking over the housing. The drive-on ramp can be provided on all sides of the housing, in particular, in each case, adjacent to a side giving access to an upper side providing the top surface which can be driven upon. A drive-on ramp may be used, although, in principle, other types of drive-on aids are of course also conceivable, for example stepped drive-on aids.

The housing can have a height of less than 20 cm, in particular less than or equal to 10 cm. These heights have proven to be extremely convenient and easy to implement in terms of driving on and off the top surface which can be driven upon. The housing may further have a width and/or length of at least 1.5 meters, in particular at least 2 meters. In this case, it may be designed, in particular in terms of width, in such a way that two opposing wheels of the motor vehicle are simultaneously located on the top surface which can be driven upon, which is the case, for example, for many motor vehicles with a width of two or more meters. With a length of at least 4, in particular at least 5 or at least 6 meters, it is also conceivable that the motor vehicle can be located completely on the top surface which can be driven upon, in particular can completely be parked thereupon. In any case, it is advantageous if the dimensions of the housing are selected in such a way that a parking space used as a ground surface which can be driven upon is covered to at least 70%, at least 80% or even at least 90%, by the housing, in particular including possible drive-on aids. In this way, the parking space is ultimately only slightly raised by the energy storage device.

As already mentioned, the reinforcing structure may be at least partly made of steel, which applies in particular to the support elements, since this makes it possible to provide particularly sturdy and durable components at low cost and complexity.

Some embodiments provide that the housing has a coupling arrangement on at least one lateral edge for connection to a further, adjacently arranged housing by means of its coupling arrangement. Further embodiments in this context provide that the coupling arrangement has at least one profile section designed to engage in a corresponding profile section of the adjacently arranged housing and/or at least one coupling element of the coupling arrangement, in particular, at least one of the at least one profile sections is designed as a fastening element of an anchoring arrangement of the energy storage device, for fastening the housing to a ground surface which can be driven upon, and/or as one of or the drive-on aid, and/or the coupling arrangement has a connecting device for establishing an electrical line connection and/or a cooling line connection to the adjacently arranged housing.

With the provision of such a coupling arrangement, it is thus possible to cover a larger area of a ground surface which can be driven upon, for example several adjacent parking spaces and/or even an entire parking lot with several parking spaces, by using several housings or energy storage devices. A modular combination solution of this kind, in which, for example, in one embodiment a drive-on aid can be removed on one side in order to connect a further housing, is particularly useful for operators of charging stations, service areas and the like, since entire areas can then be equipped with the energy buffer solution described herein.

The sturdy coupling is generally implemented using profile sections that are appropriately designed for mutual engagement, so that, for example, a projection of one profile section can engage in a corresponding recess or opening of the other profile section. It is therefore conceivable, for example, to directly hook the housing to an already installed adjacent housing, so to speak, in order to lay out the desired area in a modular manner. Of course, other coupling solutions are also conceivable, for example those that use separate fastening means.

At least one coupling element of the coupling arrangement, in particular at least one of the at least one profile sections, may be designed as a fastening element of an anchoring arrangement of the energy storage device, for fastening the housing to a ground surface which can be driven upon and/or for the drive-up aid. For example, the coupling element can have a through opening through which the fastening means, for example a bolt, can be guided. Furthermore, it is of course also conceivable, for example when using profile sections, to design detachable drive-on aids so that they can be coupled, for example by providing them with their own corresponding profile section. It is then possible, in particular, to optionally connect a further housing or to delimit the designed area by means of a drive-on aid.

The coupling arrangement may be designed such that, when two housings are connected, an electrical line connection and/or a cooling line connection is also established between the housings. Connecting means of a coupling arrangement which are correspondingly suitable are in principle known from modular devices in prior art which can be coupled in this way and therefore need not be described in more detail here. In such an embodiment, it is particularly possible, for example, to use only a single one of the connection devices and to view the housings as a single, large energy storage device.

A recycled battery unit structure of an electric motor vehicle, comprising a plurality of battery cells and a mounting structure, can, in particular, be used as at least one of the at least one battery modules. The re-use of such battery unit structures already used in motor vehicles has already been proposed in the prior art, in particular also as buffer storage for domestic or residential power grids. It is therefore also useful to be able to continue to use such battery unit structures, for example by designing at least one receptacle of the housing in such a way that such a battery unit structure can be inserted. In this context, it is also particularly conceivable that the battery unit structure will also already provide at least part of the cooling device.

In general, it should be noted that the at least one battery module may have a defined interface to the electrical cable structure and, if applicable, also to the cooling device in the housing/reinforcement structure. In particular, as explained above, when the at least one battery module, which may be replaceable, is inserted, at least the electrical connection necessary to operate the battery module is here too established. The battery module may include one or more battery cells. Overall, it can be advantageous to maximize the area occupied by energy cells in the case of the energy storage device.

Embodiments of the invention also relate to a charging arrangement for an electric motor vehicle, comprising an energy storage device of the type described herein and a motor vehicle charging device for charging the electric motor vehicle from the at least one battery module and/or the power grid. All statements relating to the energy storage device described herein can be applied in similar manner to the charging arrangement and vice versa.

In this way, a self-sufficient, integrated all-in-one charging solution is provided to the user, which combines a buffer storage and the charging infrastructure, and, in particular, due to the at least one battery module, also enables charging of the battery of the electric motor vehicle assigned to an electric motor as a traction motor when the power grid is not available or is not to be used. A space-saving, self-sufficient combination of energy storage device and motor vehicle charging device, which is to say a charging infrastructure, is provided. Maximum self-sufficiency is thereby achieved with minimum loss of usable space. The energy storage device that can be driven upon, in particular the housing, which, apart from the power grid connection, is laid out on the parking space of the electric motor vehicle or generally on the ground surface which can be driven upon without any structural modification, can be constantly charged with the maximum available power grid output, in particular by means of an integrated mains charging device. This means that the user can integrate a buffer storage unit into their charging infrastructure without any loss of usable space.

In one embodiment, the mains charging device and the vehicle charging device can be integrated as one complete charging device. Such a complete charging device can be accommodated as a structural unit in at least one receptacle formed in the housing. The charging arrangement may further comprise a control device for controlling charging and discharging operations, in particular by extending the functionality of the aforementioned control device of the energy storage device.

In some embodiments, the motor vehicle charging arrangement may be provided externally to the housing, as a separate structural unit, for example as a wallbox to be mounted on a wall, as a charging column or the like. The embodiments described herein provide an advantage in that previously unused, unmissed free space is used to accommodate the at least one battery module.

In some embodiments, it is however provided that the motor vehicle charging device is integrated into the housing, in particular in a receptacle. In this case, as already indicated, the motor vehicle charging device may be integrated with the mains charging device into a complete charging device. By integrating the motor vehicle charging device, a further saving of installation space in constrained areas is achieved, whereas the installation space created by raising the ground surface which can be driven upon, which is now used for the first time, is used more effectively.

The vehicle charging system can operate on an inductive principle or on a conductive charging principle, therefore it can supply the battery of the electric motor vehicle with electrical energy by means of a charging line or a cable. In an inductive embodiment, the inductive motor vehicle charging device has an induction coil that is installed centrally in the housing, in particular surrounded by the plurality of battery modules. In this manner, for example, the electric motor vehicle to be charged can be parked centrally or in an otherwise defined manner on the top surface of the housing which can be driven upon, therefore it can in particular be parked to bring, as much as is possible, the induction coil into alignment with a charging coil provided on the motor vehicle side. One embodiment provides that, when the electric motor vehicle to be charged is parked on the housing, a device for raising a housing part containing the induction coil of the housing out of the top surface which can be driven upon is, in particular, provided in the top side of the housing. In this manner, the induction coil can be brought closer to a charging coil on the motor vehicle side, which increases the efficiency of the energy transfer.

In the case of a conductive motor vehicle charging device, which is to say a motor vehicle charging device that charges by means of a charging cable, provision can be made for it to have a charging connection provided on the lateral side of the housing and/or on the top side of the housing and/or to comprise, in particular at the edge, a charging column which can be folded out from the top side of the housing. In this, the charging connection can be designed as a socket, but also, in particular, as a charging cable which can be pulled out of the housing, in order to be able to likewise accommodate the cable in the installation space provided. In order to create a familiar environment for the user, it can also be provided that a charging column can be folded up from the housing in the manner of a pedestal, where the user will find familiar connection options and, if necessary, also operating elements for charging their electric motor vehicle.

In general, it should also be noted, in particular also with regard to inductive charging solutions, that markings can also be applied to the top surface which can be driven upon of the housing and/or the charging arrangement can also have a positioning system for the motor vehicle, which can also communicate, for example, with a vehicle system designed for at least partially automatic guidance of the motor vehicle and can use sensors to determine a current position of the electric motor vehicle relative to a target position. Such approaches are already widely known in prior art and can also be applied to the embodiments described herein.

Some embodiments provide that the charging arrangement comprises one or more mains charging devices, wherein the motor vehicle charging device, using the at least one battery module, is adapted to provide a motor vehicle charging capacity that is greater than an output provided by the power grid. This also allows the motor vehicle charging capacity to be laid out independently of the power grid output (domestic connection output), in particular a motor vehicle charging capacity that is significantly greater than the power grid output. In this way, regardless of the domestic grid output, a higher, in particular maximum motor vehicle charging capacity can be provided, which permits significantly faster charging of the battery of the electric motor vehicle. For example, it can be provided that the motor vehicle charging capacity is 22 KW, even if the at least one battery module can only be charged with a power grid output of 11 kW from the power grid. If the electric motor vehicle is at least partially charged from the power grid, the missing differential output can be provided by the at least one battery module to increase the motor vehicle charging capacity beyond the grid output. In particular, the control device for controlling the charging operation can therefore also be designed to provide a differential output between the output of the power grid and the motor vehicle charging capacity from the at least one battery module.

It should also be noted at this point that the use of an energy storage device in a charging arrangement to provide a higher vehicle charging capacity than the power grid output is already advantageous, even independently of the flat design of the housing of the energy storage device which can be driven upon, since the higher charging outputs mean that shorter charging times can be provided irrespective of the actual power grid output. Thus, for example, a charging arrangement for an electric motor vehicle is conceivable which has at least one battery module, a mains charging device for charging the at least one battery module from a power grid and a motor vehicle charging device for charging the electric motor vehicle from the at least one battery module and/or the power grid, which is characterized in that the motor vehicle charging device, using the at least one battery module, is designed to provide a motor vehicle charging capacity which is greater than a power grid output provided by the power grid. All statements relating to the charging arrangement described herein can be applied in similar manner to conceivable charging arrangements.

It should also be noted in general that the control of the charging operation, as is known in principle, can of course use different charging conditions, for example a partial use of power grid output from the power grid and a partial use of discharge output from the at least one battery module, a simultaneous charging of the battery of the electric motor vehicle and of the at least one battery module and the like.

Lastly, some embodiments of the invention also relate to a method for installing an energy storage device as described herein or a charging arrangement as described herein, which is characterized in that the housing is laid out flat on a ground surface which can be driven upon, in particular on a motor vehicle parking area, and that the energy storage device is connected to the power grid. The statements concerning the energy storage device described herein and the charging arrangement described herein also apply accordingly to the method described herein.

The housing may be arranged to cover at least 70%, in particular at least 80%, or at least 90%, of a ground surface which can be driven upon within a garage and/or the parking space.

The energy storage device or charging arrangement can also be designed, independently of the provision of an anchoring arrangement, in a manner allowing them to be uninstalled, which is to say to once again easily be removed from the ground surface which can be driven upon in order to restore the previous vacant state. In an embodiment with a coupling arrangement, several housings can also be connected with one another. The use of such a combination is of benefit to operators of charging stations and/or rest stops and/or in public spaces, since the approach using the flat, buffer storage or battery storage that can be driven upon in combination with a charging infrastructure protected against vandalism, which is to say in particular the motor vehicle charging device integrated into the housing, offers an all-in-one system that concurrently ensures the greatest possible independence from grid connections. Further housings can be coupled depending on the electrical energy storage size required. Of course, coupling to further electrical energy storage systems, for example to systems installed underground and the like, is also, in principle, conceivable.

BRIEF DESCRIPTION OF THE SEVERAL VIEWS OF THE DRAWINGS

Further advantages and details will be apparent from the embodiment examples described below and from the drawings.

DETAILED DESCRIPTION

Figure 1:
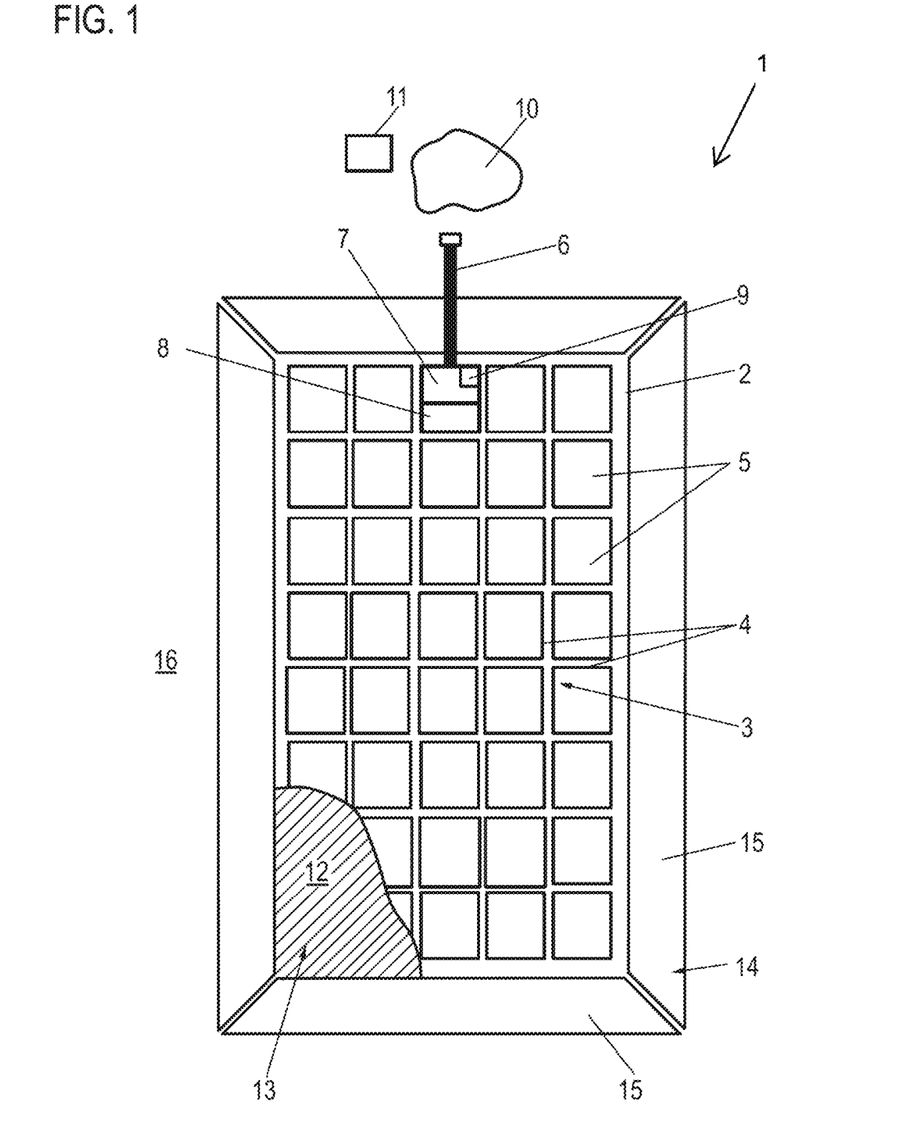
FIG. 1 shows a schematic top view of an energy storage device.

FIG. 1 shows a schematic top view of an energy storage device 1. The energy storage device 1 has a housing 2, which is shown partially open at the top for improved illustration in FIG. 1. A reinforcing structure 3 is provided within housing 2, which in this case is cuboidal in shape and has a height of 10 cm, a width of 2.5 meters and a length of 5 meters, but may also have other dimensions, which structure 3 has steel support elements 4 which extend in a lattice-like manner horizontally, and where appropriate also vertically, and which support elements form segments or receptacles of equal size, in which—with the exception of one receptacle—battery modules 5 are inserted in a removable and thus replaceable manner, each of which comprises at least one battery cell, for example a pouch cell. A unit is inserted into a receptacle adjacent to a connection device 6, which unit in this case implements a mains charging device 7, components of a cooling device 8 and a control device 9 for controlling the operation of the energy storage device 1, in particular the charging and discharging operation of the battery modules 5, which are electrically coupled together for collectively charging an electric motor vehicle. The energy storage device 1 can be connected to a power grid 10, for example a common domestic power grid, by means of the connection device 6 so that the battery modules 5 can be charged with power grid output from the power grid 10 and can also release energy back into this power grid 10, so that the energy storage device 1 as a whole acts as a buffer storage (energy buffer). In particular, a motor vehicle charging device 11 for an electric motor vehicle can also be connected to the power grid 10, so that the electric motor vehicle can thus be charged by means of electrical energy stored in the battery modules 5.

As already elucidated, housing 2 is flat and without great vertical rise. On its upper side, shown in part, it has a top surface 12 on which a motor vehicle can drive, wherein the corresponding structural sturdiness is provided by the reinforcing structure 3. Passenger vehicles (cars) were considered as the design standard for the reinforcing structure 3 in this case. In order to obtain good grip on the top surface which can be driven upon 12, the upper side of the housing 2, for example a cover plate in said location, which can also be understood as part of the reinforcement structure 3, can have a structuring 13. A friction-enhancing coating is also conceivable.

In order to allow motor vehicles to comfortably drive onto the top surface which can be driven upon 12, ramps 15 are arranged on all sides of the housing 2 as drive-on aids 14.

The energy storage device 1 can thus be positioned on a ground surface which can be driven upon 16, in particular a parking space for motor vehicles, for example in a garage, whereby the height of the ground surface which can be driven upon—which is prolonged by the top surface which can be driven upon 12—is locally raised, but this does not result in any significant disadvantages, so that ultimately previously unused free space is used for the energy storage device 1 without leading to space problems, for example occupying storage spaces for bicycles and/or lawnmowers and/or making movement around a parked motor vehicle more difficult.

It should also be noted at this point that it is conceivable to provide the energy storage device 1 with an anchoring arrangement in order to achieve a particularly displacement-resistant attachment to the ground surface which can be driven upon 16.

Figure 2:
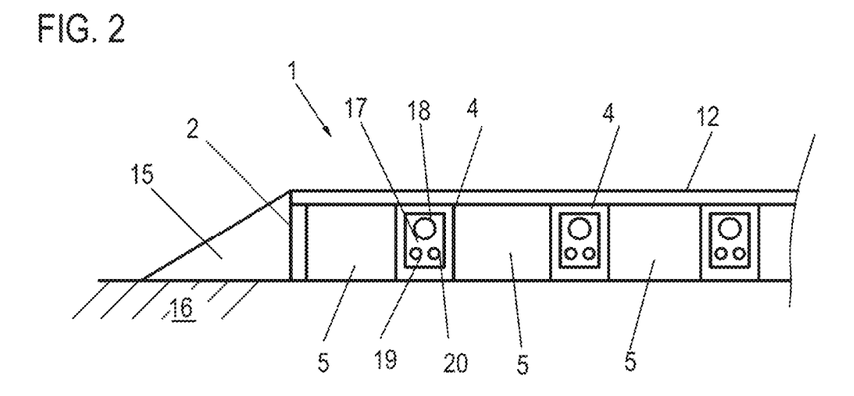
FIG. 2 shows a cross-section through the energy storage device of FIG. 1.

FIG. 2 shows a partial cross-section of the energy storage device 1 of FIG. 1. It is evident that the support elements 4 acting as reinforcing struts are designed as square elements made of steel, which have an inner cavity 17, which, in this case, is used to conduct a cooling line 18 for a cooling fluid of the cooling device 8, electrical lines 19 and control signal lines 20.

Figure 3:
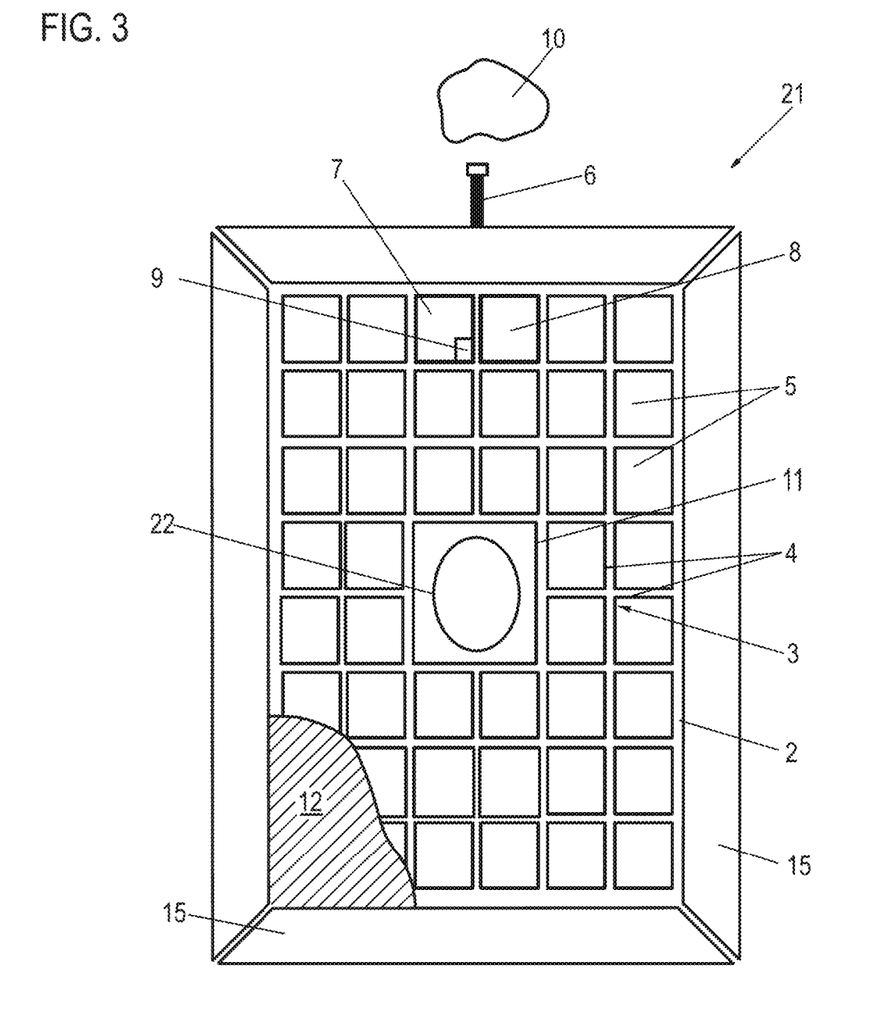
FIG. 3 shows a top view of a charging arrangement.

FIG. 3 now shows a schematic top view of a charging arrangement 21, in which, similar to FIG. 1, the housing 2 is once again shown partially open at the top in order to be able to see the internal structure in more detail. Corresponding components are marked with the same reference numbers. In contrast to the energy storage device 1 of FIG. 1, the motor vehicle charging device 11 which is designed for inductive charging is now also integrated centrally in the housing 2 and can also be integrated with the mains charging device 7 as a complete charging device. The overall operation of the charging arrangement 21 continues to be controlled by means of the control device 9. As a variation on the energy storage device 1 in FIG. 1, components of the cooling device 8 are moreover shown in a separate receptacle; however, the structural unit of FIG. 1 can also continue to be used.

The motor vehicle charging device 11 has an induction coil 22 that can cooperate with a charging coil of an electric motor vehicle that is to be charged in order to charge a battery associated with an electric motor that is used as a drive motor of the electric motor vehicle. As shown by the cross-section of FIG. 4, chosen as a central section in this case, the motor vehicle charging device 11, in particular the induction coil 22, is associated with a lifting device 23 by means of which, when the electric motor vehicle is correctly positioned on the top surface which can be driven upon 12, the induction coil 22 aligned in a vertical direction with the charging coil of the electric motor vehicle can be lifted upwards to create a shorter distance between these two cooperating coils, which improves the efficiency of the charging operation. Moreover, for the correct positioning of the electric motor vehicle on the top surface which can be driven upon 12, the latter may also have corresponding markings (not shown).

Figure 4:
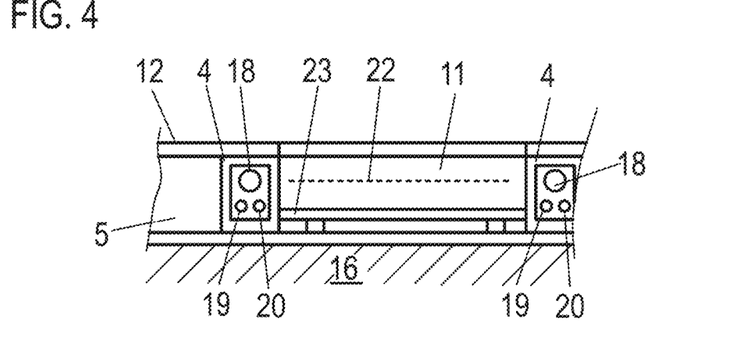
FIG. 4 shows a cross-sectional view of the charging arrangement according to FIG. 3.

A further special feature of the design of the charging arrangement 21 is that the motor vehicle charging device 11 can provide a higher motor vehicle charging capacity than the power output provided by the power grid 10. In this case, the control device 9 is designed to provide the differential output between the power output of the power grid 10 and the vehicle charging capacity from the battery modules 5. In particular, charging conditions in which the total motor vehicle charging capacity is drawn from the battery modules 5 are also possible, so that self-sufficient charging is made possible after the battery modules 5 have been charged, for example during the day using a photovoltaic device. The charging arrangement 21 may also be referred to as a "self-sufficient island" because of the self-sufficiency provided.

Figure 5:
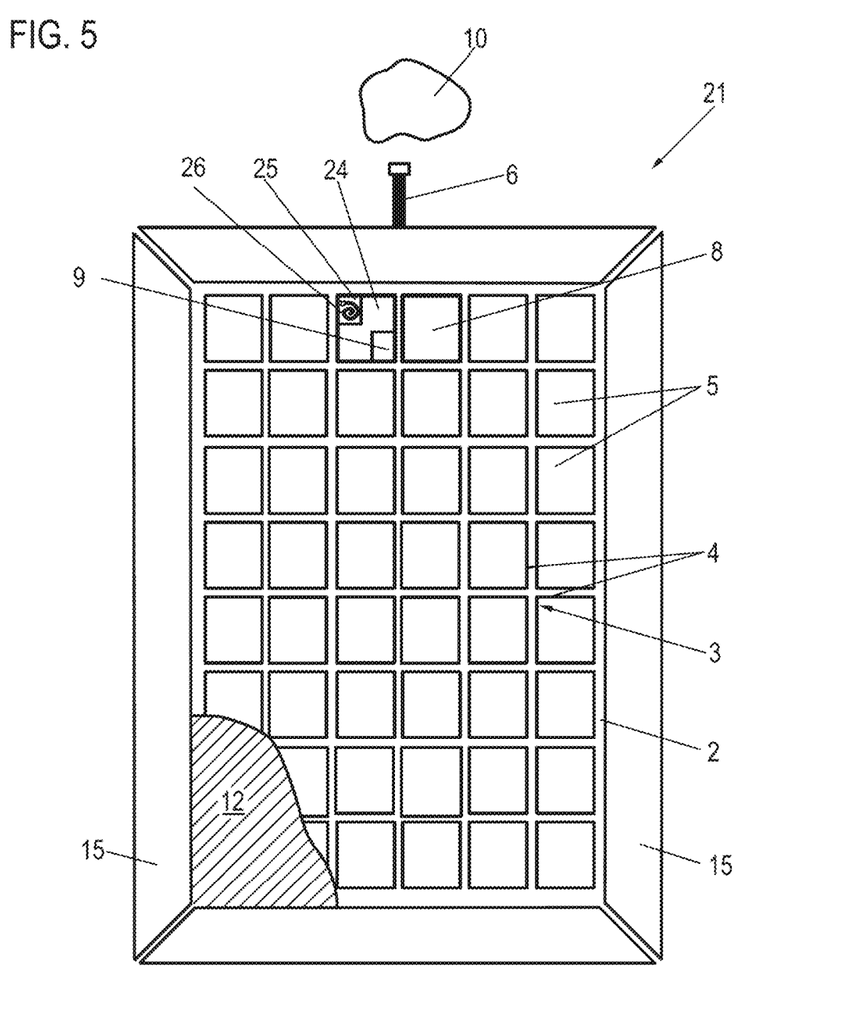
FIG. 5 shows a second embodiment of a charging arrangement.

FIG. 5 shows a second embodiment of a charging arrangement 21', in which the motor vehicle charging device 11 is designed as a conductive system, which is to say it charges by means of a charging cable 26, and is integrated with the mains charging device 7 to form a complete charging device 24, which is furthermore controlled overall by the control device 9. The charging cable 26, which can be pulled out of the housing 2, is provided as the conductive charging connection 25.

In addition to the two embodiment examples of charging arrangements 21, 21' shown here, an embodiment, for example, in which a charging column can be folded out from the top of the housing 2 is also conceivable.

Figure 6:
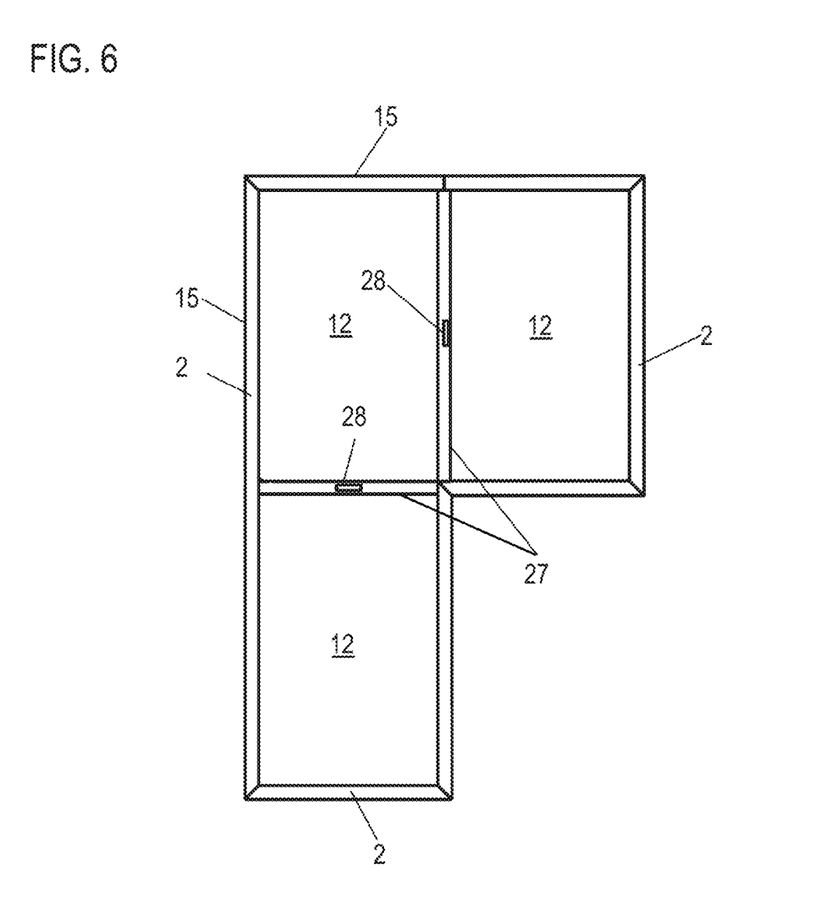
FIG. 6 shows coupled housings on a ground surface which can be driven upon.

Lastly, FIG. 6 shows how an extension of the top surface which can be driven upon 12 by the addition of further housings 2 can take place, by means of a coupling arrangement 27 on the housings 2. In the case in point, three housings 2 are coupled to one another here using their respective coupling arrangement 27, wherein the corresponding ramps 15, which were likewise attached to profile sections of the coupling arrangement 27, have been removed and profile sections of adjacent housings 2 now engage with one another in order to connect these housings to one another. Drive-on ramps 15 continue to be provided on the sides where no further housing 2 adjoins. Electrical line connections and/or cooling line connections (cooling fluid connection) to the respective adjacent housing 2 can be established by means of connection devices 28, so that it is possible, in particular, to operate the compound structure as one common, enlarged energy storage device 1 or charging arrangement 21, 21' by means of a common control device 9 and the total quantity of battery modules 5.

German patent application no. DE 10 2020 123475.9, filed Sep. 9, 2020, to which this application claims priority, is hereby incorporated herein by reference in its entirety.

Aspects of the various embodiments described herein can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrical energy storage device for charging an electric motor vehicle, comprising:
a flat mat-like form factor that is configured to be arranged on and in direct contact with a ground surface over a wide area of the ground surface and to be driven upon for charging of the electric motor vehicle, the flat mat-like form factor including:
a plurality of battery modules electrically coupled together and configured to collectively charge the electric motor vehicle during a charging operation;
a housing accommodating the plurality of battery modules in a stationary manner within the housing, wherein each of the plurality of battery modules is provided in a respective one of a plurality of receptacles of the housing to remain stationary within the receptacle during the charging operation;
a connection device for connection to a power supply for charging the plurality of battery modules from a power grid; and
a reinforcing structure which enables the electric motor vehicle to drive over a top surface of the energy storage device, wherein the reinforcing structure has support elements arranged within the housing that are spaced equidistantly in each of two mutually perpendicular directions and extend over essentially an entire extent of the housing, wherein the support elements are arranged in a lattice-like manner and define the plurality of receptacles for receiving each respective battery module in intermediate spaces of the support elements, wherein each respective battery module is arranged in the respective one of the plurality of receptacles in an exchangeable manner, and wherein at least one support element is designed as a hollow body and configured to contain at least one of: an electrical line to at least one of the battery modules, a control signal line to at least one of the battery modules, and a cooling line for a cooling fluid of a cooling device of the energy storage device, wherein the cooling fluid serves to cool at least one of the battery modules.

2. The energy storage device according to claim 1, wherein the top surface is formed by a top side of the housing and the housing is at least substantially cuboidal.

3. The energy storage device according to claim 1, wherein the energy storage device further has at least one drive-on aid including a ramp arranged on at least one lateral edge of the housing.

4. The energy storage device according to claim 1, wherein the housing has a coupling arrangement on at least one lateral edge for connection to a further, adjacently arranged housing by a further coupling arrangement of the further housing.

5. The energy storage device according to claim 1, wherein each respective battery module comprises a battery unit structure, including a recycled battery unit structure of an electric motor vehicle, comprising a plurality of battery cells and a mounting structure.

6. The energy storage device according to claim 1, further comprising at least one mains charging device, which is installed in the housing for charging each respective battery module from the power grid by the connection device.

7. The electrical energy storage device of claim 1, wherein the motor vehicle is a passenger car.

8. The electrical energy storage device of claim 1, wherein the housing has a height of less than or equal to 10 cm and a width of at least 2 meters, and/or a length of at least 2 meters.

9. The electrical energy storage device of claim 1, further comprising a fastening element of an anchoring arrangement of the energy storage device for fastening the housing and/or a drive-on aid directly to the ground surface which can be driven upon.

10. The electrical energy storage device of claim 1, wherein the housing has a height of less than 20 cm, a width of at least 1.5 meters, or a length of at least 1.5 meters.

11. The electrical energy storage device of claim 1, wherein the reinforcing structure, including the support elements, is at least partially made of steel.

12. The energy storage device according to claim 1, wherein the housing has a coupling arrangement on at least one lateral edge, the coupling arrangement including a connecting device for establishing an electrical line connection or a cooling line connection to an adjacently arranged housing.

13. A charging arrangement for an electric motor vehicle, comprising:
an energy storage device including a flat mat-like form factor that is configured to be arranged on and in direct contact with a ground surface over a wide area of the ground surface and to be driven upon for charging of the electric motor vehicle, the flat mat-like form factor including:
a plurality of battery modules electrically coupled together and configured to collectively charge the electric motor vehicle during a charging operation;
a housing accommodating the plurality of battery modules in a stationary manner within the housing, wherein each of the plurality of battery modules is provided in a respective one of a plurality of receptacles of the housing to remain stationary within the receptacle during the charging operation;
a connection device for connection to a power supply for charging the plurality of battery modules from a power grid;
a reinforcing structure which enables the electric motor vehicle to drive over a top surface of the energy storage device, wherein the reinforcing structure has support elements arranged within the housing that are spaced equidistantly in each of two mutually perpendicular directions and extend over essentially an entire extent of the housing, wherein the support elements are arranged in a lattice-like manner and define the plurality of receptacles for receiving each respective battery module in intermediate spaces of the support elements, wherein each respective battery module is arranged in the respective one of the plurality of receptacles in an exchangeable manner, and wherein at least one support element is designed as a hollow body and configured to contain at least one of: an electrical line to at least one of the battery modules, a control signal line to at least one of the battery modules, and a cooling line for a cooling fluid of a cooling device of the energy storage device, wherein the cooling fluid serves to cool at least one of the battery modules; and
a motor vehicle charging device for charging the electric motor vehicle from the plurality of battery modules and/or from the power grid.

14. The charging arrangement according to claim 13, wherein the motor vehicle charging device is integrated in the housing.

15. The charging arrangement according to claim 14, wherein the motor vehicle charging device has an induction coil that is installed centrally in the housing and that is surrounded by the plurality of battery modules, or the motor vehicle charging device charges by a charging cable and has a charging connection provided on the lateral side of the housing and/or on the top side of the housing, or the motor vehicle charging device comprises a charging column which can be folded out from the top side of the housing.

16. The charging arrangement according to claim 13, further comprising a mains charging device, wherein the motor vehicle charging device, using the plurality of battery modules is designed to provide a motor vehicle charging capacity which is greater than a power grid output provided by the power grid.

17. The charging arrangement according to claim 16, further comprising a control device for controlling the charging operation, which is designed to provide a differential output between the output of the power grid and the motor vehicle charging capacity from the plurality of battery modules.

* * * * *